Jan. 31, 1928.
C. D. STEWART
1,657,558
AUTOMOTIVE BRAKE
Filed Feb. 5, 1926
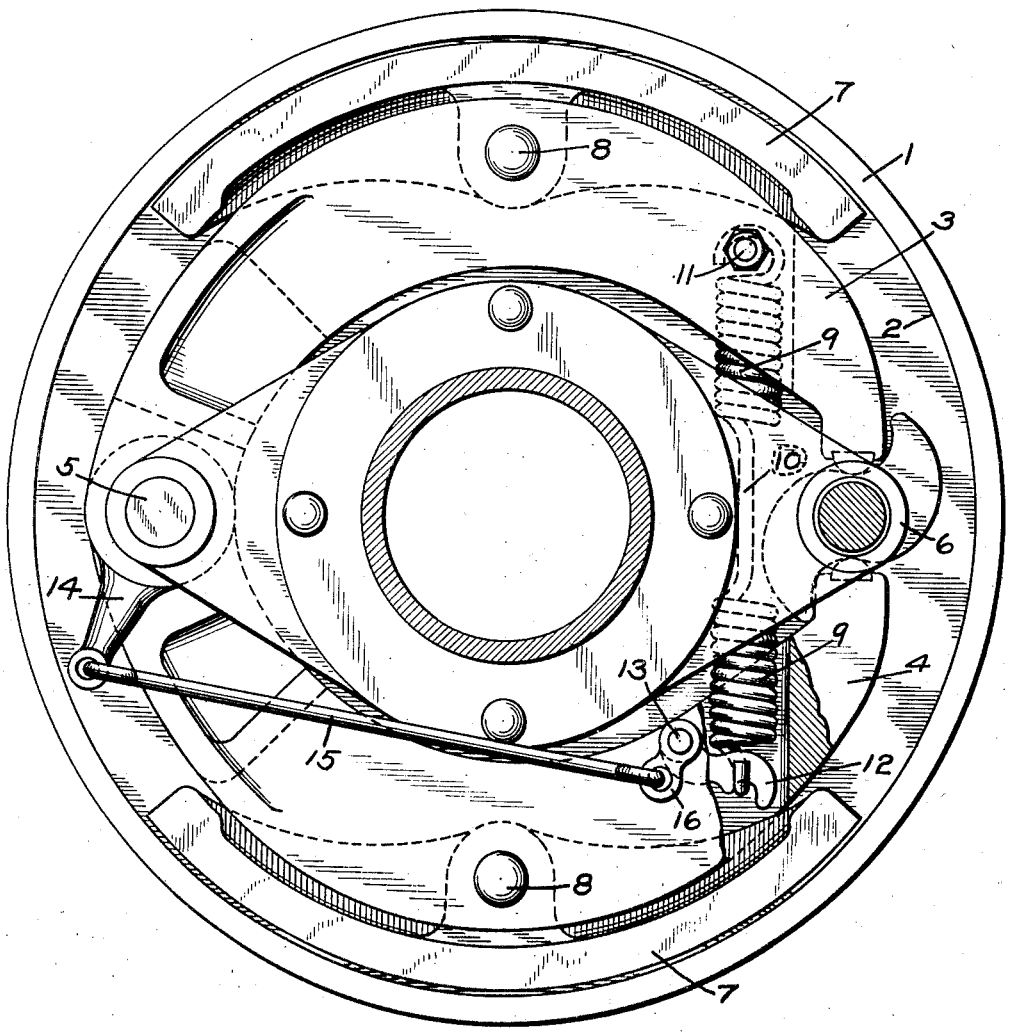
INVENTOR
CARLTON D. STEWART
BY *Wm. M. Cady*
ATTORNEY Patented Jan. 31, 1928.

1,657,558

UNITED STATES PATENT OFFICE.

CARLTON D. STEWART, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed February 5, 1926. Serial No. 86,205.

This invention relates to vehicle brakes and more particularly to the type of vehicle brake having brake shoes adapted to engage the internal friction face of a brake drum.

With a vehicle brake of the above character, and more particularly when metal brake shoes are employed, it has been found desirable to provide thick brake shoes and renewable brake drum liners, so that more wear can take place than heretofore and consequently, the wearing parts do not need to be so frequently renewed.

With greater wear, there will be a greater movement of the brake shoes and the brake shoe heads in applying and releasing the brakes, and a consequent increased stretch of the release spring. As the wear increases and the stretch of the release spring increases, the resistance of the spring also increases and thus requires an increased pressure to be applied to the operating cam in order to provide the same braking power.

Furthermore, by reason of the necessarily limited length of the release spring, the spring may be stretched so as to give it a permanent set. Such setting of the spring permanently weakens the same, so that it is not in proper condition for use when the operating cam is returned to its normal release position.

The principal object of my invention is to obviate the above difficulty, by providing means for reducing the extent of stretch of the release spring in proportion to the extent the brake heads move due to wear of the brake shoes or otherwise.

In the accompanying drawing, the single figure is a face view, with the cover plate removed, of an internal expanding drum type of vehicle brake, showing my improvement embodied therein.

The brake, as shown in the drawing, comprises a brake drum 1, having an internal friction face 2 and brake heads 3 and 4 connected together at one side by a pivot pin 5 and having interposed between the free ends at the opposite side, an operating cam 6. The brake heads 3 and 4 are mounted within the drum 1 and each is provided with a metal brake shoe 7, which may be pivotally connected to the corresponding brake head by a pivot pin 8.

A release spring is provided having coil sections 9 connected by a central link portion 10 which provides clearance for the cam 6. The spring extends into a channel formed in each brake head and one end of the spring is hooked over a pin 11. The other or opposite end of the spring is hooked over one arm 12 of a bell crank lever, and is pivotally mounted within the channel of the brake head 4 on a pin 13.

Carried by the brake head 3 and extending radially from the pivot pin 5 is an arm 14, the end of which is connected to a link 15. The opposite end of the link is connected to the other arm 16 of the bell crank lever.

The brake heads 3 and 4 and the brake shoes 7 are yieldingly maintained in release position by the release spring coils 9, as shown in the drawing. When the cam 6 is rotated to apply the brakes, the free ends of the brake heads 3 and 4 are spread apart and the brake heads are forced outwardly, causing the brake shoes 7 to frictionally engage the friction face 2 of the brake drum 1.

As the brake heads move outwardly, the arm 14 will move in a counter-clockwise direction about the pivot or hinge pin 5, so that the link 15 will move toward the right and thus permit a counter-clockwise movement of the bell crank lever. The stretching of the release spring is consequently limited to the difference between the extent the pin 11 and the pin 13 move outwardly away from each other and the extent the bell crank lever is permitted to move, dependent upon the length of the arm 14 and the leverage ratio of the arms 12 and 16 of the bell crank lever.

The amount the release spring stretches will thus be reduced by the movement of the bell crank lever, so that excessive stretching of the spring is prevented.

Having now described my invention, what I claim as new and desire to secure by Letters Patent, is:

1. In a vehicle brake, the combination, with a brake drum, brake heads mounted therein, and means for expanding said brake heads, of a release spring for resisting expansive movement of said brake heads and means for expanding said spring at a rate less than the rate of expansion of the brake heads.

2. In a vehicle brake, the combination with a brake drum, brake heads mounted therein, and means for expanding said brake heads, of a release spring for resisting expansive movement of said brake heads and means for expanding said spring throughout each expansive movement of the brake heads at a rate less than the rate of expansion of said heads.

3. In a vehicle brake, the combination with a pair of expansible braking members, of a release spring connected to one member, a lever arm carried by the other member and connected to said spring, and means operatively connected to the first braking member for operating said lever arm.

4. In a vehicle brake, the combination with a pair of expansible braking members, of a release spring connected to one member, a lever arm pivotally mounted on the other braking member and connected to said spring, an arm movable with the first mentioned braking member, and means operatively connecting said arm with said lever arm.

5. In a vehicle brake, the combination with a pair of expansible braking members, of a release spring connected to one member, a bell crank member pivotally mounted on the other braking member and connected to said spring, and means controlled by the movement of the first mentioned braking member for operating said bell crank lever to effect the expansion of said spring.

6. In a vehicle brake, the combination with a pair of expansible braking members, of a release spring connected to one of said members, a rotatable member carried by the other braking member and connected to said spring, and means for permitting a rotative movement of said rotatable member proportionate to the expansive movement of said braking members.

7. In a vehicle brake, the combination with a brake drum and expansible brake heads associated with said drum, of a release spring connected to one brake head, a rotatable lever carried by the other brake head and connected to said spring, and means for permitting rotation of said lever as the brake heads are expanded.

In testimony whereof I have hereunto set my hand.

CARLTON D. STEWART.